(12) United States Patent
King

(10) Patent No.: US 6,283,062 B1
(45) Date of Patent: Sep. 4, 2001

(54) SEED CATCHING CAGE APRON

(76) Inventor: Richard King, 105 West La., Sayville, NY (US) 11782

( * ) Notice: Subject to any disclaimer, the term of this patent is extended or adjusted under 35 U.S.C. 154(b) by 0 days.

(21) Appl. No.: 09/318,868

(22) Filed: May 26, 1999

(51) Int. Cl.$^7$ .................................................. A01K 31/06
(52) U.S. Cl. ............................................................. 119/469
(58) Field of Search ................... 119/452, 459, 119/467, 469

(56) References Cited

U.S. PATENT DOCUMENTS

| | | | |
|---|---|---|---|
| 310,085 | * 12/1884 | Schultz | 119/469 |
| 1,186,782 | * 6/1916 | Hercer | 119/469 |
| 1,460,102 | * 6/1923 | Leon | 119/469 |
| 3,356,400 | 12/1967 | French . | |
| 3,510,010 | 5/1970 | Gasner . | |
| 3,894,316 | 7/1975 | Johnson . | |
| 4,027,453 | 6/1977 | Bridge . | |
| 4,991,544 | * 2/1991 | Galvin et al. | 119/469 |
| 5,201,278 | * 4/1993 | Hehn | 119/469 |
| 5,508,902 | 4/1996 | Shoemaker . | |
| 5,957,086 | * 9/1999 | Gallardo | 119/469 |

* cited by examiner

Primary Examiner—Charles T. Jordan
Assistant Examiner—Elizabeth Shaw
(74) Attorney, Agent, or Firm—Galgano & Burke

(57) ABSTRACT

An improved seed catching cage apron includes four identical pieces. Each piece is a substantially trapezoidal sheet having long parallel sides and short angled sides. An L-shaped tab is located on one of the angled sides near the longer of the parallel sides and an angled flange extends along most of the length of the other angled side. The angle of the angled sides and the angle of the angled flange are such that when four of the pieces are arranged together, the parallel sides of adjacent pieces meet at right angles with the angled flange of each sheet lying parallel to the surface of an adjacent sheet. In this configuration, the L-shaped tab of each sheet interlocks the angled flange of an adjacent sheet. According to the preferred embodiment, a notch is provided on each angled side near the short parallel side for receiving and engaging a corner post of a rectangular cage structure. Other preferred aspects of the invention include providing a lip along the long parallel side so that it is blunted and more attractive, fabricating the sheets from sheet metal, and attaching the flange and tab by welding.

19 Claims, 5 Drawing Sheets

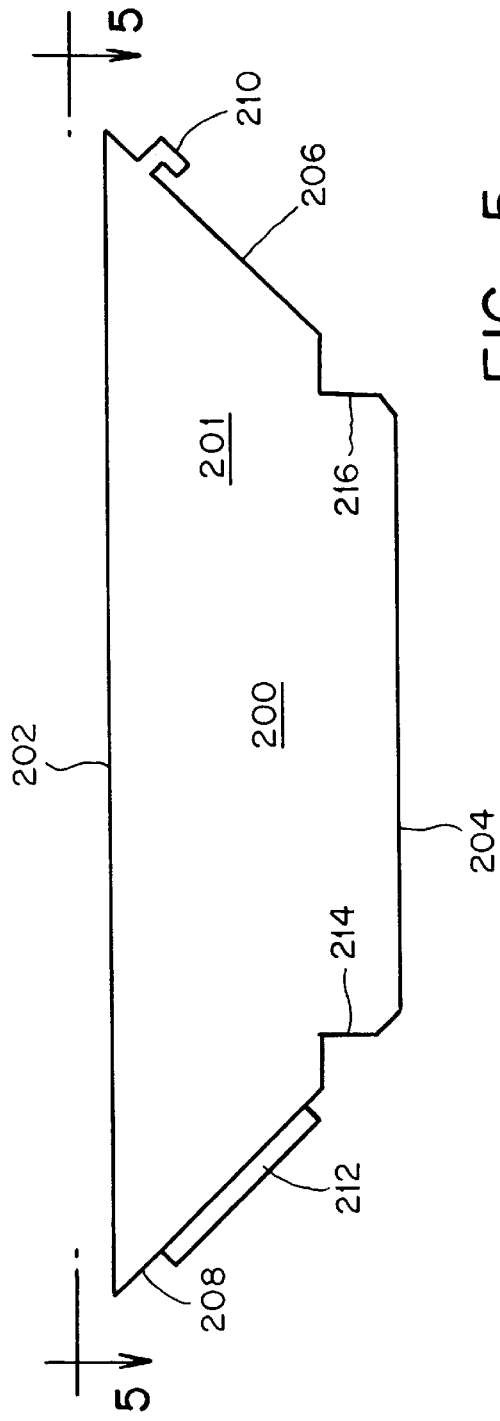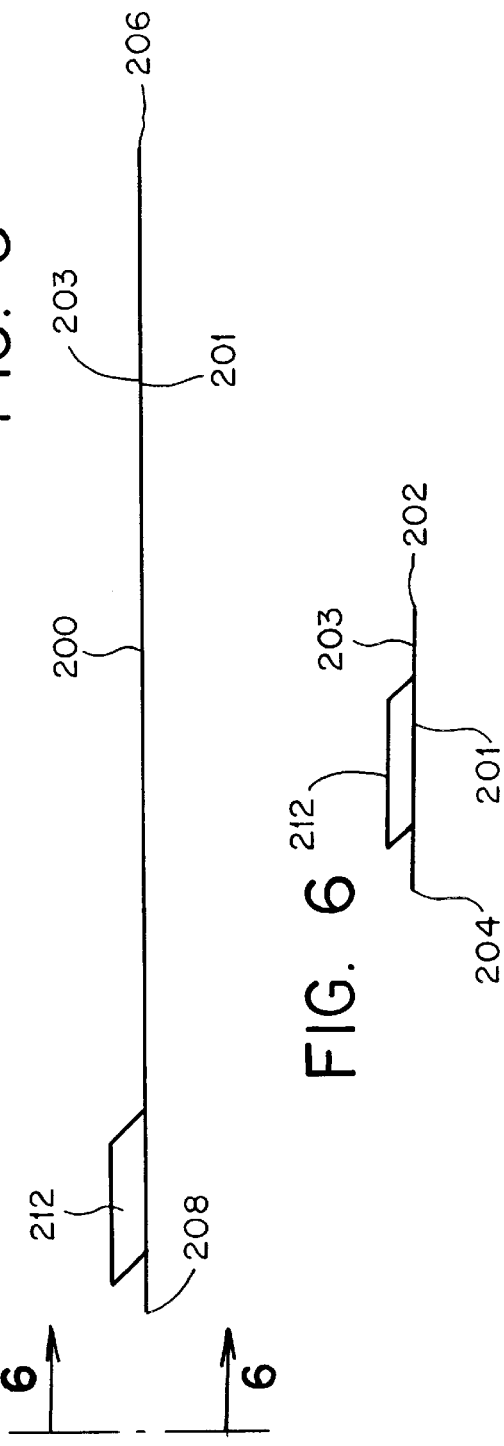

SEED CATCHING CAGE APRON

BACKGROUND OF THE INVENTION

1. Field of the Invention

The invention relates to cages for birds and small animals. More particularly, the invention relates to a cage apron which is designed for a rectangular cage and which is attachable to the bottom of the cage to catch seed which falls from immediately outside the cage and which is easily removed for cleaning.

2. State of the Art

Birds and small animals are popular pets. Generally, these pets are housed in a wire mesh cage that can range in size from ten inches square, to cages having four to five foot sides. One problem associated with the use of these wire cages is that the enclosed animal has a tendency to scatter debris outside the perimeter of the cage. The floor area directly around the cage then becomes littered with food particles, bedding chips and other debris from inside the cage.

Prior art FIG. 1 illustrates one known solution to this problem. FIG. 1 illustrates a seed guard 10 that is attachable to a bird cage 12. The seed guard has a total of twelve parts; four elongate, flexible transparent seed guards 14, one for each side of a four-sided cage, and four corner pieces 16 of two parts each. Each corner piece 16 includes a horizontally disposed top part 18 that snap fittingly engages a cage corner bar and a bottom part 20 disposed about forty five degrees from the horizontal that also snap fittingly engages a cage corner bar; the two parts of each corner piece 16 snap fittingly engage each other away from the cage so that the free or leading ends of each corner member engage the same corner bar at vertically spaced locations. Each corner bar and the two parts secured thereto form a strong, triangular assembly that cannot be removed from the cage directly by a bird or indirectly by gravity acting on a swinging cage. While this seed guard may be effective in solving the problem of debris exiting the case, its complex construction makes it difficult to assemble and disassemble for cleaning.

Prior art FIG. 2 shows another solution to the problem. The apron 22 has four corner "locking members" 24 and four side "ratchet members" 26 which are ratcheted into the locking members for telescopically joining the members into a frame like structure for mounting on the cage 28. Each of the members is formed with an upper flanged edge 30 and an opposite lower support edge (not shown). The flanged edges of the two members align with each other into a locked relationship when the two members are telescopically joined. A plurality of removable tabs (not shown) extend outwardly from the support edge of the ratchet member for extending through the cage bars. While this cage apron is somewhat simpler than the earlier prior art solution, it is still relatively difficult for one person to assemble/disassemble the apron, particularly with a large cage.

SUMMARY OF THE INVENTION

It is therefore an object of the invention to provide an apron for a pet cage to prevent debris from exiting the cage.

It is also an object of the invention to provide a cage apron which is easy to assemble and disassemble.

It is another object of the invention to provide a cage apron which is inexpensive to manufacture.

In accord with these objects which will be discussed in detail below, the cage apron of the present invention includes four identical pieces. Each piece is a substantially trapezoidal sheet having long parallel sides and short angled sides. An L-shaped tab is located on one of the angled sides near the longer of the parallel sides and an angled flange extends along most of the length of the other angled side. The angle of the angled sides and the angle of the angled flange are such that when four of the pieces are arranged together, the parallel sides of adjacent pieces meet at right angles with the angled flange of each sheet lying parallel to the surface of an adjacent sheet. In this configuration, the L-shaped tab of each sheet interlocks the angled flange of an adjacent sheet. According to the preferred embodiment, a notch is provided on each angled side near the short parallel side for receiving and engaging a corner post of a rectangular cage structure. Other preferred aspects of the invention include providing a lip along the long parallel side so that it is blunted and more attractive, fabricating the sheets from sheet metal, and attaching the flange and tab by welding. Additional objects and advantages of the invention will become apparent to those skilled in the art upon reference to the detailed description taken in conjunction with the provided figures.

BRIEF DESCRIPTION OF THE DRAWINGS

FIG. 4 is a plan view of the in-side of one of the apron pieces of the invention;

FIG. 5 is a view of the apron piece of FIG. 4 looking in the direction 5—5;

FIG. 6 is a view of the apron piece of FIG. 5 looking in the direction 6—6;

DETAILED DESCRIPTION OF THE PREFERRED EMBODIMENTS

Figure 1:
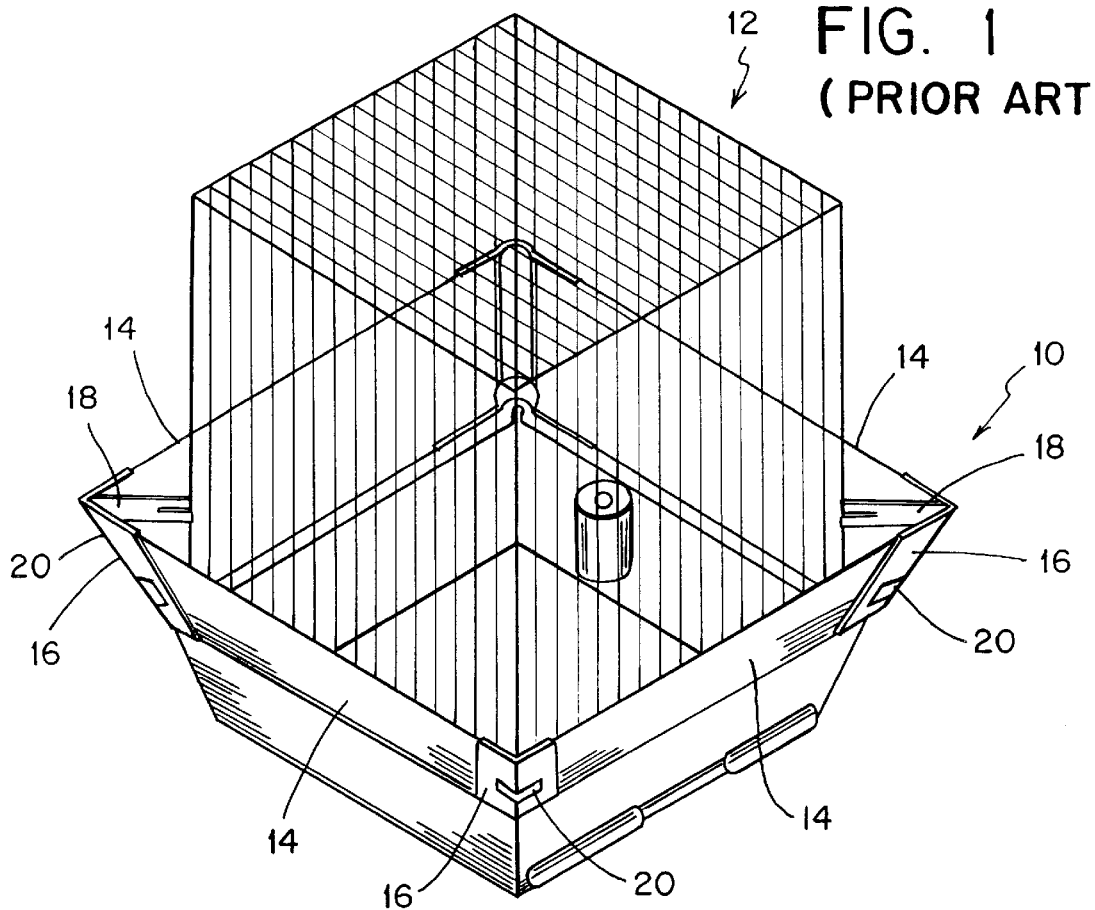
FIG. 1 is a perspective view of a prior art cage apron attached to a rectangular cage.
Figure 2:
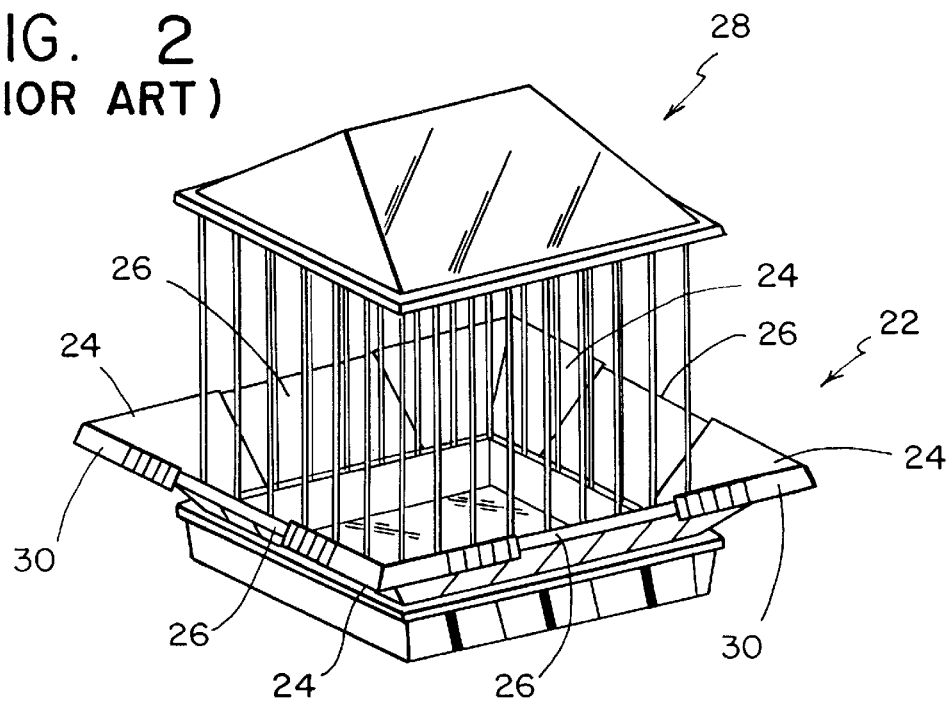
FIG. 2 is a perspective view of another prior art cage apron attached to a rectangular cage.
Figure 3:
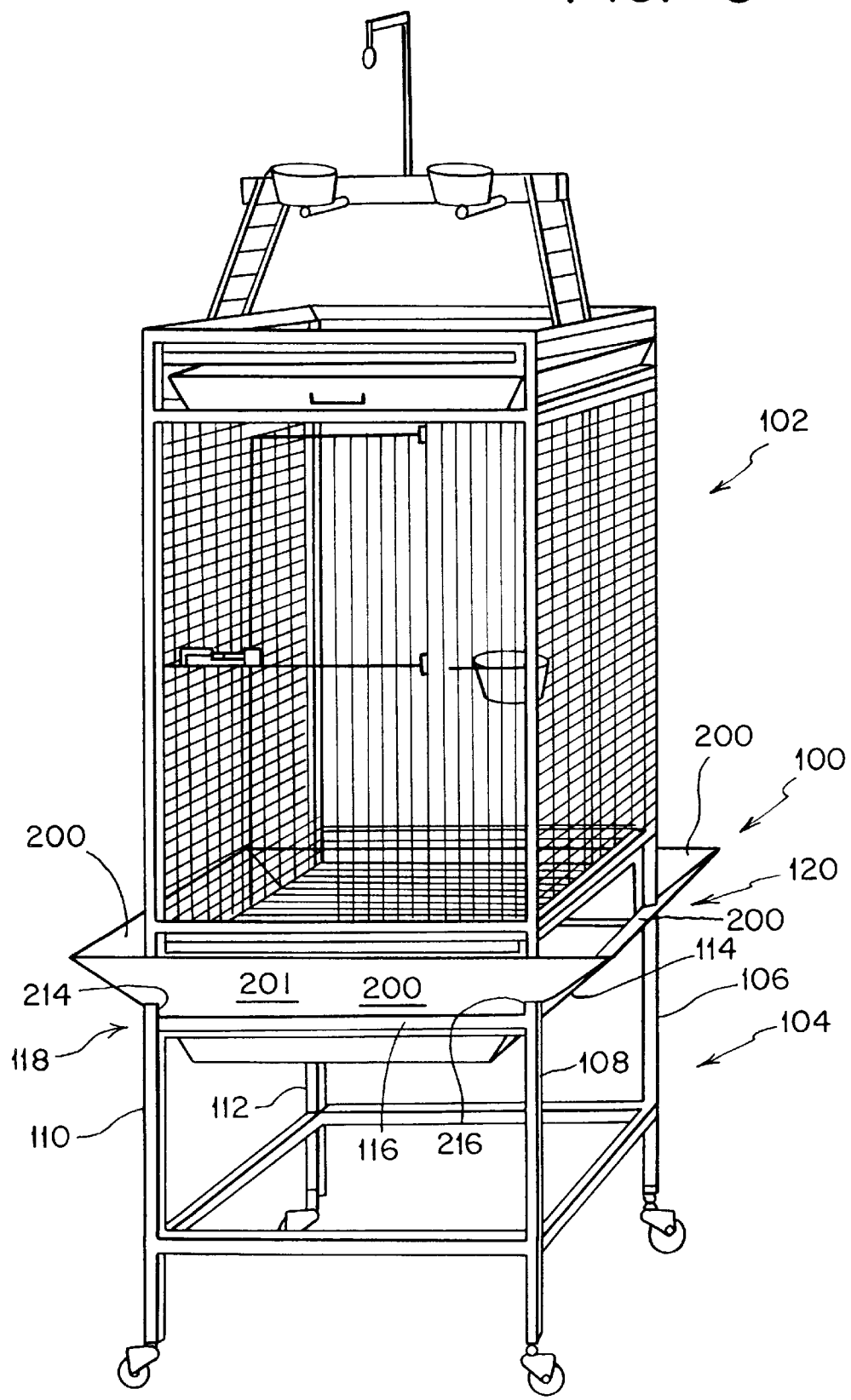
FIG. 3 is a perspective view of a cage apron according to the invention attached to a rectangular cage.
Figure 7:
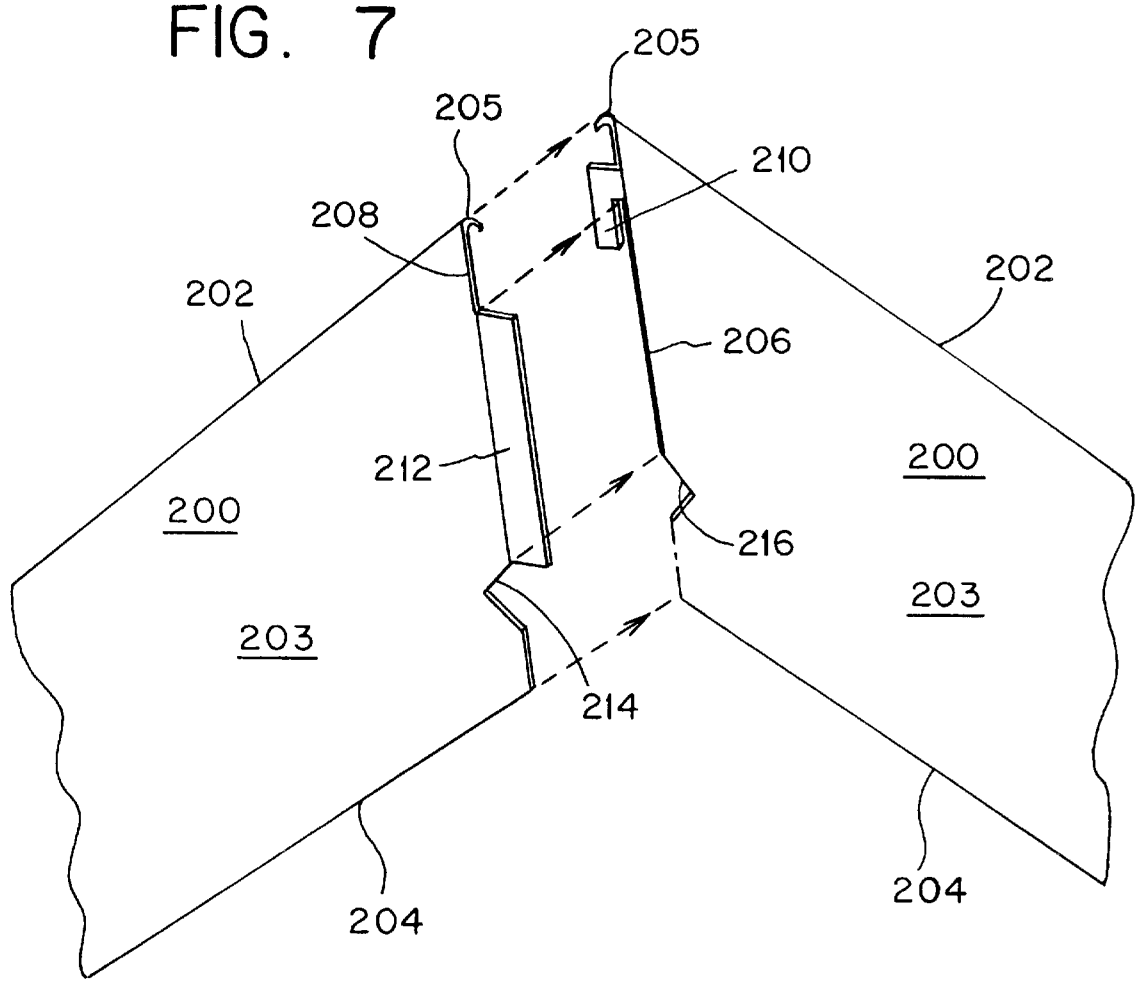
FIG. 7 is a broken perspective view of the in-sides of two apron pieces near assembly.
Figure 9:
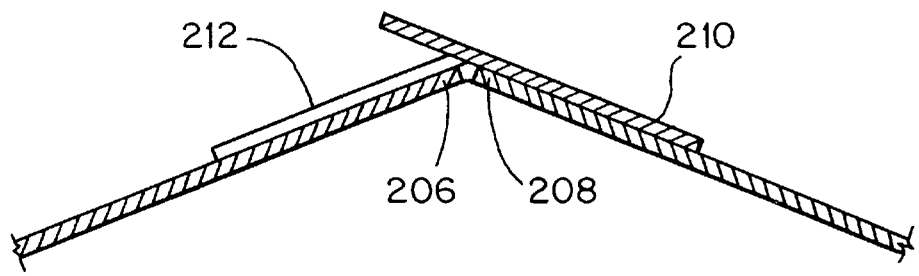
FIG. 9 is a sectional view taken along line 9—9 in FIG. 8.
Figure 8:
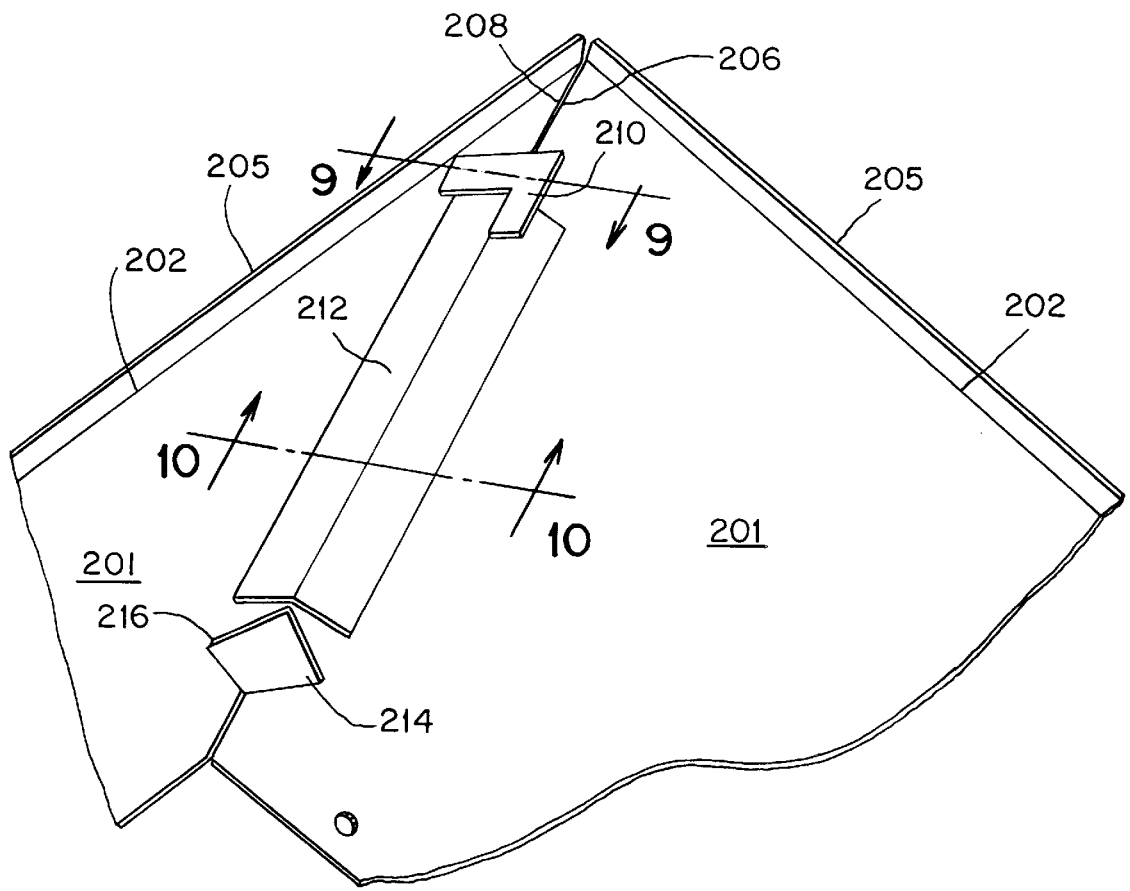
FIG. 8 is a broken perspective view of the out-sides of two apron pieces assembled.
Figure 10:
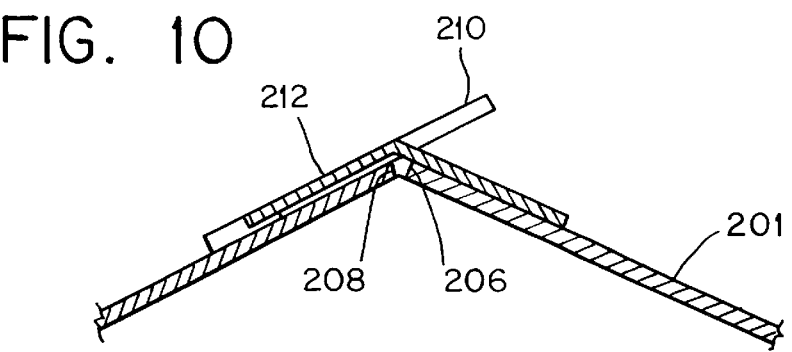
FIG. 10 is a sectional view taken along line 10—10 in FIG. 8.

Referring now to FIGS. 3 through 6, the cage apron 100 is designed for use with a rectangular cage 102 which is supported by a frame 104 having four posts 106, 108, 110, 112 and four horizontal bars 114, 116, 118, 120. The apron is an assembly of four identical pieces 200. As seen best in FIGS. 4–6, each piece 200 is a substantially trapezoidal sheet having two long parallel sides 202, 204, two short angled sides 206, 208, an outside surface 201, and an inside surface 203 An L-shaped tab (hook) 210 is located on one of the angled sides 206 near the longer 202 of the parallel sides 202, 204 and an angled flange 212 extends along most of the length of the other angled side 208. The angle of the angled sides 206, 208 and the angle of the angled flange 212 are such that when four of the pieces 200 are arranged together as shown in FIG. 3, the parallel sides 202, 204 of adjacent pieces meet at right angles. Those skilled in the art will appreciate that the sum of the angle of the angled side and the angle of the angled flange must equal 90° in order for the assembly to form a rectangle. It will also be appreciated that the invention can be made to fit around any polygonal cage (e.g. a hexagonal cage) by adjusting the angles of the angled sides and the angled flange. According to the presently preferred embodiment, the angle of the angled sides and the angle of the angled flange are both 45°. As seen best in FIG. 4, the member 200 is preferably provided with two notches 214, 216 where the angled sides 206, 208 meet the lower side 204. These notches are dimensioned to fit around the vertical posts (e.g. 108, 110) of the cage 100 as shown in FIG. 3. As shown, the notches are dimensioned to fit around rectangular posts, but it will be appreciated that other configurations could be used depending on the configuration of the cage stand 104. When the apron is assembled as shown in FIG. 3, each member 200 is supported by a horizontal bar of the cage frame.

Turning now to FIGS. 7–10, when assembled, the angled flange 212 of each sheet 200 lies against the outside surface 201 of an adjacent sheet. In this configuration, the L-shaped tab 210 of each sheet interlocks the angled flange 212 of an adjacent sheet. According to the preferred embodiment, a lip 205 is provided along the top side 202 so that it is blunted and more attractive. Also according to the presently preferred embodiment, the hook 210 and the flange 212 are formed from separate pieces and attached to the outside surface 201 of each member 200. The presently preferred material is enamel painted metal and the hook 210 and the flange 212 are welded to the sheet 200. However, it will be appreciated that the hook 210 and the flange 212 may be formed as integral parts of a single sheet of material. It will also be appreciated that the member 200 may be made of other materials such as plastic.

As can be appreciated, due to the fact that the apron sheets 200 are not mechanically fastened together by screws, bolts or the like, the apron can be easily removed from the cage by simply sliding out the individual sheets from one another. In this way the sheets can be easily removed, cleaned and reassembled in a quick and facile manner.

There have been described and illustrated herein several embodiments of an improved seed catching apron for use with an animal cage. While particular embodiments of the invention have been described, it is not intended that the invention be limited thereto, as it is intended that the invention be as broad in scope as the art will allow and that the specification be read likewise. Thus, while particular angles have been disclosed, it will be appreciated that other angles could be utilized as described herein. Also, while particular notches have been shown, it will be recognized that other types of notches could be used as described above. Moreover, while particular configurations have been disclosed in reference to welding, it will be appreciated that other configurations could be used as explained herein. Furthermore, while the apron member has been disclosed as having an upper lip, it will be understood that the lip may be omitted without interfering with the function of the apron. It will therefore be appreciated by those skilled in the art that yet other modifications could be made to the provided invention without deviating from its spirit and scope as so claimed.

What is claimed is:

1. A seed catching cage apron for use with a polygonal animal cage, comprising:

a plurality of substantially identical apron members corresponding in number to the number of sides of the polygonal cage, each apron member being substantially trapezoidal in shape and having a pair of parallel sides defining a top edge and a bottom edge and a pair of opposite angled sides each defining a lateral edge, and each apron member having an angled flange at one of said angled sides and an L-shaped tab on the other of said angled sides, wherein when said cage apron is assembled, the angled flange of each apron member is engaged by the L-shaped tab of an adjacent member such that a leg of said L-shaped tab of one apron member lies underneath and supports the angled flange of the adjacent apron member thereby slidable joining said apron members together along their respective lateral edges.

2. A seed catching cage apron according to claim 1, wherein:

said plurality of apron members numbers four, said angled sides have a 45° angle, and said angled flanges has a 45° angle.

3. A seed catching cage apron according to claim 1, wherein:

each of said angled sides has a notch dimensioned to receive a vertical post of the animal cage.

4. A seed catching cage apron according to claim 1, wherein:

each apron member has an upper lip.

5. A seed catching cage apron according to claim 1, wherein:

each angled side and each angled flange have angles, the sum of which equals the angle formed by sides of the cage.

6. A seed catching cage apron according to claim 1, wherein:

said flange and said tab are welded to said apron member.

7. An animal cage and apron assembly, comprising:

a polygonal cage, a plurality of substantially identical apron members corresponding in number to the number of sides of said polygonal cage, each apron member being substantially trapezoidal in shape and having a pair of opposite angled sides, and each apron member having an angled flange at one of said angled sides and an L-shaped tab on the other of said angled sides, wherein when said cage apron is assembled, the angled flange of each apron member is engaged by the L-shaped tab of an adjacent member.

8. An assembly according to claim 7, wherein:

said plurality of apron members numbers four, said angled sides have a 45° angle, and said angled flanges has a 45° angle.

9. An assembly according to claim 7, wherein:

said animal cage includes a plurality of vertical posts, and each of said angled sides has a notch dimensioned to receive one of said vertical posts.

10. An assembly according to claim 7, wherein:

each apron member has an upper lip.

11. An assembly according to claim 7, wherein:

each angled side and each angled flange have angles, the sum of which equals the angle formed by sides of said cage.

12. An assembly according to claim 7, wherein:

said flange and said tab are welded to said apron member.

13. A seed catching cage apron member for use with a polygonal animal cage, comprising:

a substantially trapezoidal sheet having a pair of opposite angled sides, an angled flange at one of said angled sides, and an L-shaped tab on the other of said angled sides and wherein each of said angled sides has a notch dimension to receive a vertical post of the animal cage.

14. A seed catching cage apron member according to claim 13, wherein:

said angled sides have a 45° angle, and said angled flange has a 45° angle.

15. A seed catching cage apron member according to claim 13, further comprising:

a lip on the longest side of said sheet.

16. A seed catching cage apron member according to claim 13, wherein:

the sum of the angles of one of the angled sides and the angled flange equals the angle formed by sides of the cage.

17. A seed catching cage apron member according to claim 13, wherein:

said flange and said tab are welded to said sheet.

18. A seed catching cage apron for use with a polygonal animal cage, comprising:

a plurality of substantially identical apron members corresponding in number to the number of sides of the polygonal cage, each apron member being substantially trapezoidal in shape and having a pair of parallel sides defining a top edge and a bottom edge and a pair of opposite angled sides each defining a lateral edge, and each apron member having a flange at one of said angled sides and a slotted tab on the other of said angled sides, wherein when said cage apron is assembled, the flange of each apron member is engaged by the slotted tab of an adjacent member such that said tab of one apron member lies underneath and supports the flange of the adjacent apron member thereby slidable joining said apron members together along their respective lateral edges.

19. A seed cage apron according to claim 18, wherein said flange is angled.

* * * * *